(12) United States Patent
Tudor

(10) Patent No.: US 9,057,557 B2
(45) Date of Patent: *Jun. 16, 2015

(54) APPARATUS AND METHOD TO RECOVER AND DISPENSE POTABLE WATER

(71) Applicant: William Scott Tudor, Port St. Lucie (FI)

(72) Inventor: William Scott Tudor, Port St. Lucie (FI)

(73) Assignee: Water Technologies International, LLC, Port St Lucia, FL (US)

( * ) Notice: Subject to any disclaimer, the term of this patent is extended or adjusted under 35 U.S.C. 154(b) by 279 days.

This patent is subject to a terminal disclaimer.

(21) Appl. No.: 13/834,609

(22) Filed: Mar. 15, 2013

(65) Prior Publication Data

US 2013/0199221 A1     Aug. 8, 2013

Related U.S. Application Data

(63) Continuation of application No. 13/109,077, filed on May 17, 2011.

(60) Provisional application No. 61/645,682, filed on May 18, 2010.

(51) Int. Cl.
*F25D 21/14*    (2006.01)
*F24F 3/14*    (2006.01)
*F24F 13/22*    (2006.01)
*F24F 6/00*    (2006.01)

(52) U.S. Cl.
CPC .............. *F25D 21/14* (2013.01); *F24F 3/1405* (2013.01); *F24F 13/222* (2013.01); *F24F 2006/006* (2013.01); *F24F 2013/227* (2013.01)

(58) Field of Classification Search
CPC . F24F 3/1405; F24F 13/222; F24F 2013/227; F24F 2006/006; F25D 21/14
USPC ........................................ 62/93, 291, 264, 389
See application file for complete search history.

(56) References Cited

U.S. PATENT DOCUMENTS

| | | | |
|---|---|---|---|
| 5,106,512 A | | 4/1992 | Reidy |
| 5,517,829 A | | 5/1996 | Michael |
| 5,587,055 A | * | 12/1996 | Hartman et al. .................. 203/1 |
| 5,669,221 A | | 9/1997 | LeBleu et al. |
| 5,766,453 A | * | 6/1998 | Morellato et al. ............ 210/143 |
| 5,845,504 A | | 12/1998 | LeBleu |
| 6,058,718 A | | 5/2000 | Forsberg et al. |
| 6,182,453 B1 | * | 2/2001 | Forsberg .......................... 62/125 |
| 6,207,046 B1 | * | 3/2001 | Yamashita et al. ............ 210/138 |
| 6,574,979 B2 | | 6/2003 | Faqih |
| 6,871,675 B1 | * | 3/2005 | Marszalec et al. .............. 141/82 |
| 7,089,763 B2 | | 8/2006 | Forsberg et al. |
| 7,272,947 B2 | | 9/2007 | Anderson et al. |
| 7,373,787 B2 | | 5/2008 | Forsberg et al. |

(Continued)

FOREIGN PATENT DOCUMENTS

KR    10-2005-0031164 A    4/2005
KR    10-2008-0107109 A    12/2008

*Primary Examiner* — Mohammad M Ali
(74) *Attorney, Agent, or Firm* — Harris, Shelton, Hanover & Walsh; Susan B Fentres

(57) ABSTRACT

An apparatus and system to produce purified drinking water from humid air is provided. The apparatus includes a condenser and evaporator coil assembly with a source of germicidal activity. A method to provide purified drinking water from humid air using a stand along apparatus is provided. The apparatus can also dehumidify, improve air-quality and provide air-conditioning.

4 Claims, 17 Drawing Sheets

(56) References Cited

U.S. PATENT DOCUMENTS

| | | | |
|---|---|---|---|
| 7,721,560 B2 * | 5/2010 | Carpenter | 62/176.6 |
| 2002/0069653 A1 * | 6/2002 | Goodchild | 62/188 |
| 2006/0157152 A1 * | 7/2006 | Wolski et al. | 141/275 |
| 2008/0104974 A1 * | 5/2008 | Dieckmann et al. | 62/93 |
| 2008/0245092 A1 | 10/2008 | Forsberg et al. | |
| 2009/0077992 A1 * | 3/2009 | Anderson et al. | 62/291 |

* cited by examiner

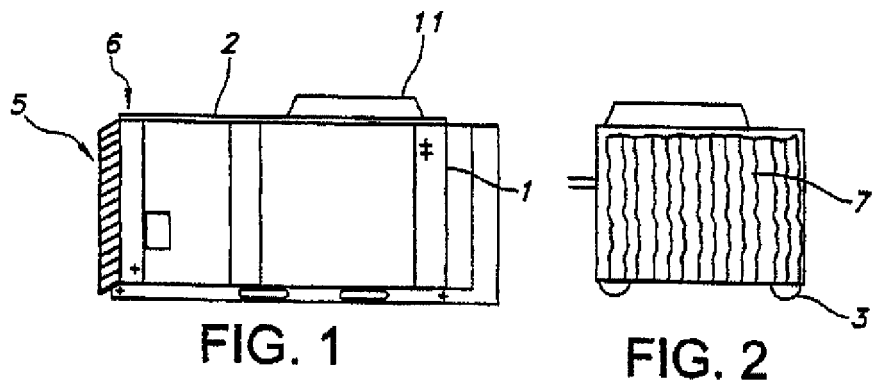
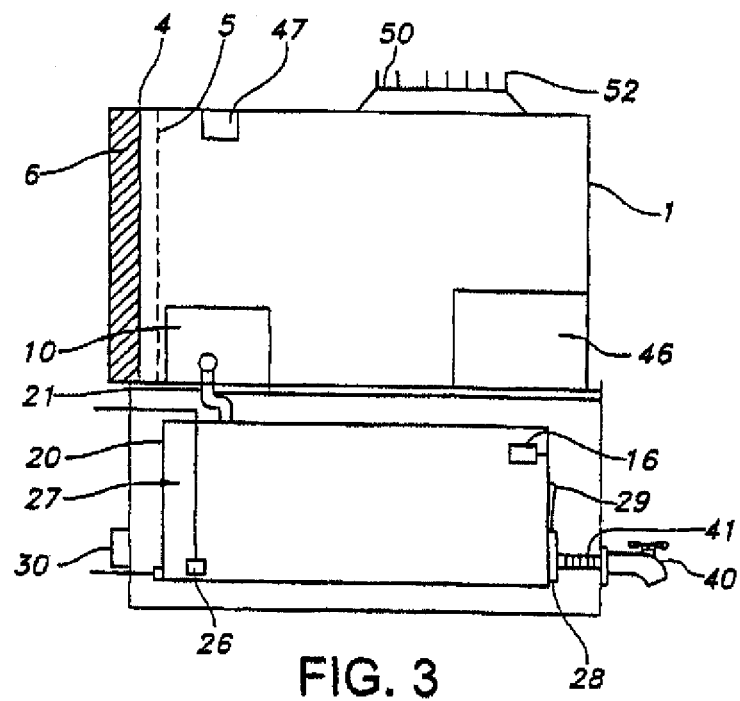

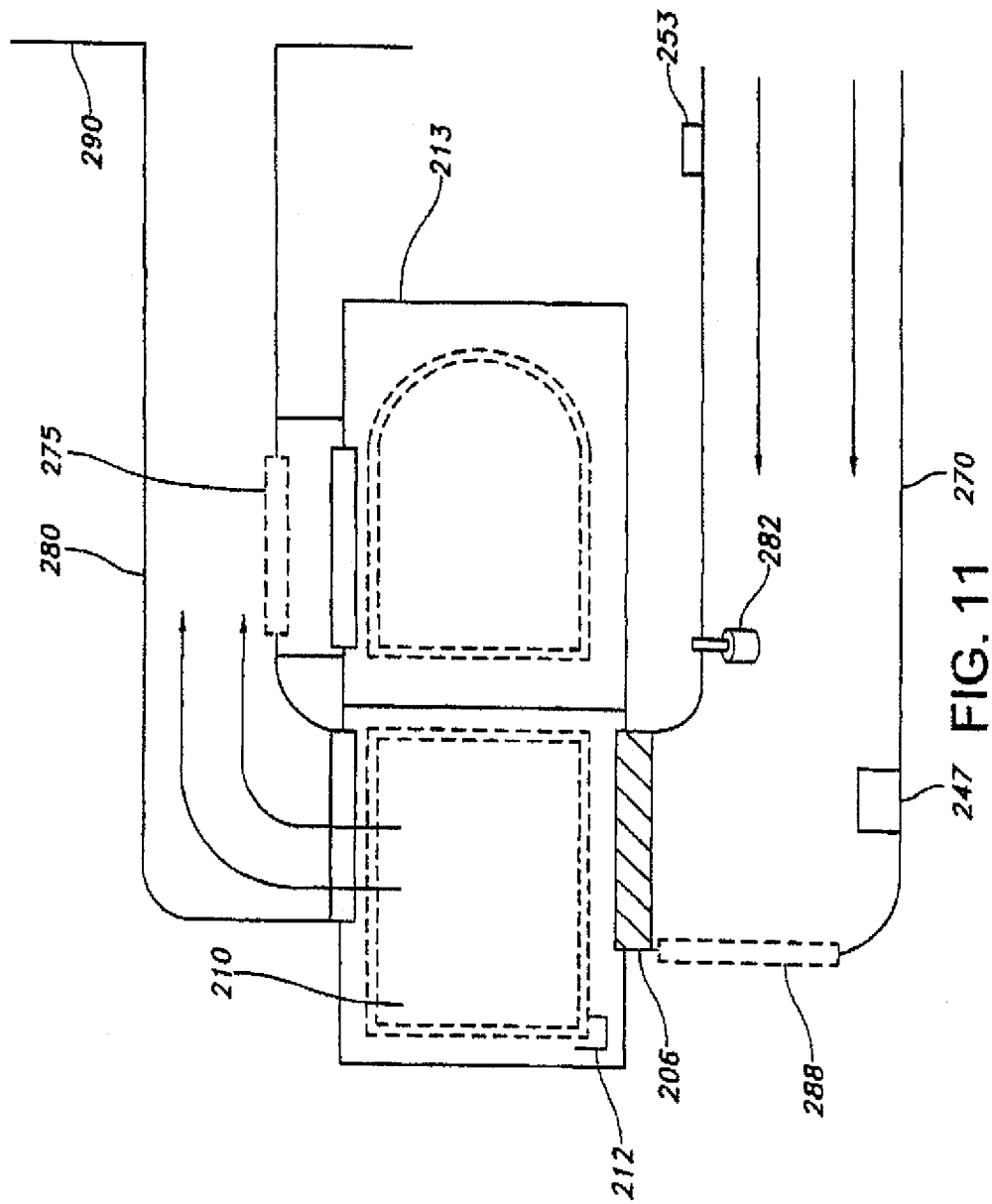

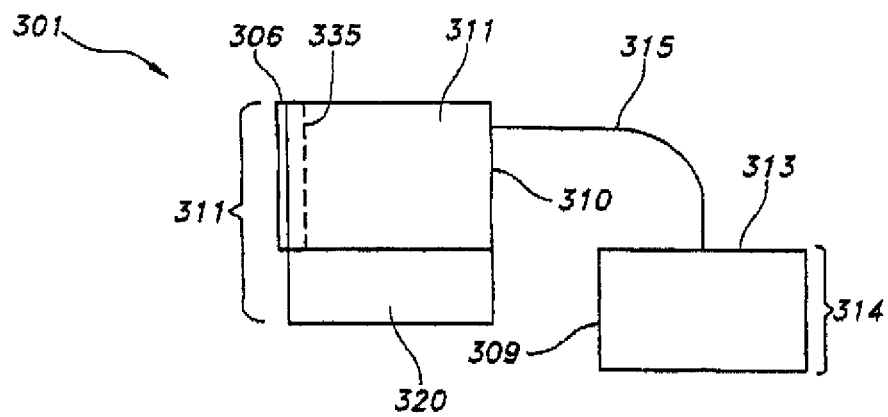
FIG. 12A
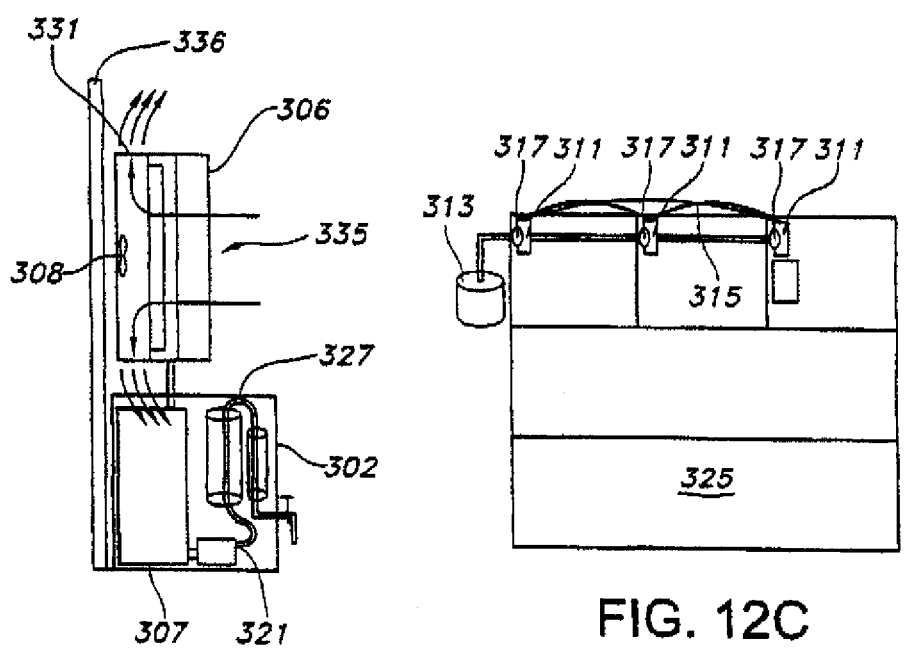
FIG. 12B
FIG. 12C

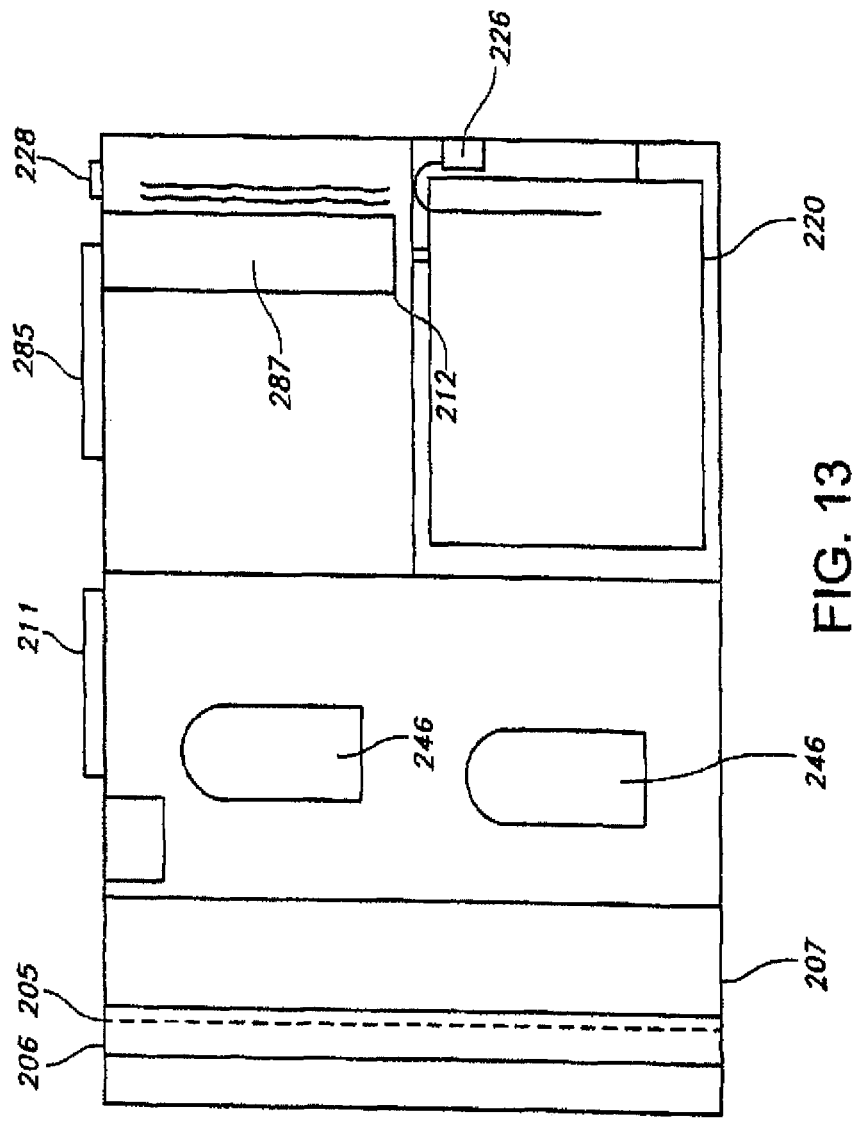

APPARATUS AND METHOD TO RECOVER AND DISPENSE POTABLE WATER

CROSS REFERENCE TO RELATED APPLICATION

This application claims the benefit of U.S. provisional patent application Ser. No. 61/645,682 filed May 18, 2010 and U.S. patent application Ser. No. 13,109,077 filed May 17, 2011 under 35 U.S.C. §119(e) (hereby specifically incorporated herein by reference).

STATEMENT REGARDING FEDERALLY SPONSORED RESEARCH OR DEVELOPMENT

None.

REFERENCE TO SEQUENCE LISTING, A TABLE FOR A COMPUTER PROGRAM LISTING, COMPACT DISC APPENDIX

None.

FIELD OF INVENTION

This invention primarily relates to an apparatus to recover and dispense potable water and secondarily to dehumidify, improve air-quality and provide air-conditioning in certain embodiments.

BACKGROUND OF INVENTION

In a refrigeration cycle, a refrigerant changes vapor to liquid and gives up heat in the condenser coil ("hot coil"). Refrigerant changes from liquid to vapor and removes heat from the system with an evaporator coil ("cool coil"). A refrigeration system is powered by a compressor. Most central air conditioners are connected to a structure's forced-air distribution system. Thus, the same motor, blower, and ductwork used for heating are used to distribute cool air from the air conditioning system. When a central air conditioner is operating, hot air inside the structure flows to the furnace through the return-air duct. The hot air is moved by the blower across the cooled evaporator coil in the plenum and is then delivered through ducts to cool the structure. The coil used in air-conditioning apparatus, such as a furnace, air handling units, heat pumps and package air conditioners, extracts moisture from the air which flows across the coil. The moisture extracted creates a condensate on the exterior of the evaporator coil which drips into a drain pan. A condensate drain pan catches condensate that forms on the coil or return tubing and the condensate is delivered via condensate drain conduit away from the apparatus, as shown for example in U.S. Pat. No. 7,430,877.

In many areas of the world, air and water quality problems are common. These problems include lack of clean drinking water, air contaminated with particulate and poor indoor air quality because of high humidity. Portable water production units have been developed to condense water out of humid air. One example, of a device to produce potable water, is disclosed by Reidy, U.S. Pat. No. 5,106,512 (column 17). However, potable water production units that have been developed to condense water out of humid air produce an inadequate amount of water over a period of time and it is not worth the energy cost to produce such a small amounts of water with the prior art devices.

BRIEF SUMMARY OF THE INVENTION

An apparatus to purify water is provided that has features that allow the production of a sufficient amount of water to make the investment in energy to operate the device a viable option in developing countries for making potable water and improving living conditions. In particular, an apparatus configured to extract water vapor from ambient air and condense the water vapor into liquid water, wherein the device includes an evaporation surface having corrugated shaped fins of between 5-8 fins per cm coupled with a fan to facilitate movement of air across the evaporator device, can efficiently condense water. In addition to the aspects of the invention that increase the quantity of water produced over time, the quality of the water can also be improved using an air purification unit that substantially covers the air inlet for ambient air of the apparatus. In the preferred embodiment, the air purification unit is an electrostatic filter. Additionally, in one embodiment, at least one water purification unit is positioned to purify the condensed water. In another embodiment, the apparatus additionally produces cool air. This embodiment additionally includes: an air-conditioning coil and a second fan positioned to expel cold air from the outlet ports of the apparatus.

More specifically this apparatus includes: a housing including an inlet to intake ambient air, an air purification unit substantially covering said inlet, an evaporator device configured to extract water vapor from ambient air and condense the water vapor into liquid water, wherein the device includes an evaporation surface having corrugated shaped fins of between 5-8 fins per cm; a fan to facilitate movement of air across the evaporator device to condense water; a reservoir to hold condensed water; and at least one water purification unit positioned to purify the condensed water; and a dispensing device to dispense potable water.

The apparatus is used to make potable water by operating the fan at various speeds to facilitate the extraction of water from ambient air and at a second speed to expel cold air from a plurality of outlet ports in the housing. This method produces about 26.5 liters of potable water in 18 hours of operation depending on the humidity (65 percent at 72 degree F.).

In another embodiment, this invention provides a system to provide air-conditioning to a structure and recover and dispense water. This system is made of: at least one housing including an inlet to intake ambient air, an air purification unit substantially covering said inlet, an evaporator device configured to extract water vapor from ambient air and condense the water vapor into liquid water, wherein the device includes an evaporation surface having corrugated shaped fins of between 5-8 fins per cm, wherein the evaporator device is in fluid communication with a condensing coil; a fan to facilitate movement of air across said evaporator device to condense water; at least one reservoir to hold condensed water; and at least one water purification unit positioned to purify the condensed water; and a dispensing device to dispense potable water, and a fan positioned to expel cold air from outlet ports, wherein the at least one housing is attached to a dwelling.

BRIEF DESCRIPTION OF THE SEVERAL VIEWS OF THE DRAWING

Other objects, features and advantages will occur to those skilled in the art from the following description of the preferred embodiments, and the accompanying drawings, in which:

FIG. 1 shows a schematic side elevational view of one embodiment of the apparatus.

FIG. 2 shows a schematic front elevational view of one embodiment of an apparatus.

FIG. 3 shows a schematic view of one embodiment of an apparatus.

FIG. 11 shows a schematic view of one embodiment of an apparatus.

FIG. 12A shows a schematic view of one embodiment of an apparatus.

FIG. 12B shows a schematic view of one embodiment of an apparatus.

FIG. 12C shows a schematic view of one embodiment of an apparatus.

FIG. 13 shows a schematic view of one embodiment of an apparatus.

DETAILED DESCRIPTION OF THE INVENTION

Figure 4:
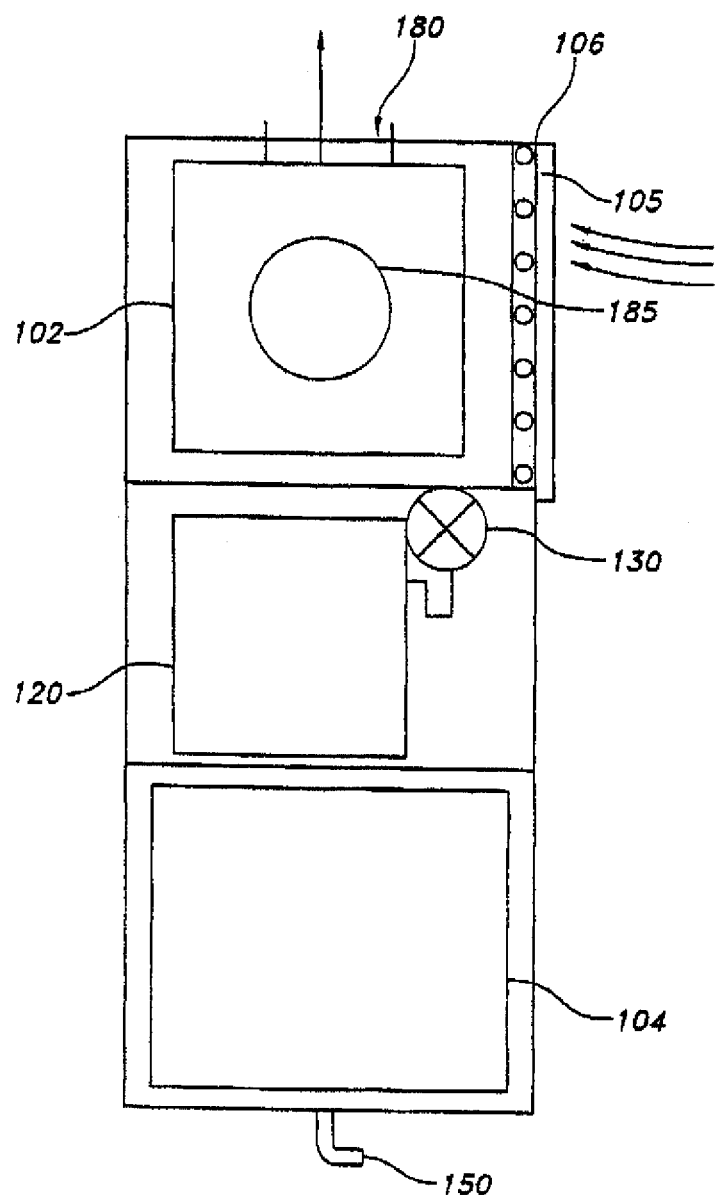
FIG. 4 shows a schematic view of one embodiment of an apparatus.

Reference will now be made to the exemplary embodiments illustrated in the drawings, and specific language will be used herein to describe the same. Now referring to FIGS. 1-3, a portable apparatus 1 to produce drinking water is shown. Apparatus 1 is made of a housing 2 and alternatively includes wheels 3 to move the apparatus 1. The housing 2 has at least one face 4 including an inlet to intake ambient air 5, and a plurality of openings, such as, holes, louvers or perforations 5. The air inlet 5 allows ambient air to enter the apparatus 1. The term ambient air means air from inside or outside of a structure, such as a dwelling.

The ambient air contacts an air purification unit, such as, a filter 6. This air purification unit 6, in the preferred embodiment, is an in-line high efficiency particulate air electrostatic filter that substantially covers the air-inlet 5. Filter 6 is attached to the housing 2 using brackets (not shown) to provide a secure attachment and can be off-set from the housing 2 by a space. In the preferred embodiment, the space is about 2.5 cm. The brackets are configured to seal the space around filter 6 to prevent air from entering the apparatus 1 that has not passed through filter 6. In an alternative embodiment the filter is electrostatic.

In one embodiment, filter 6 is placed inside of the housing 2. The filter 6, in the preferred embodiment, is an electrostatic filter 6. The filter 6 is sized to remove airborne particulate. In an alternative embodiment the air purification unit can include an in-line air purifying device 47 using ozone and ultraviolet light without an electrostatic filter, a dust filter (not shown) should be used to reduce particulate.

Inside the housing 2, moist ambient air is drawn over an evaporator device 10 with an evaporating surface, by a fan 11 positioned to facilitate the movement of air across the evaporation surface. Since the saturation vapor pressure of water decreases with decreasing temperature, the water in the air condenses, and drips into a reservoir 20. In the preferred embodiment, the evaporator device 10 includes a series of tubes and substantially perpendicular fins 7. The fins 7 are selected to facilitate condensation of moisture from the air and in the preferred embodiment are corrugated and are configured as 5-8 fins per centimeter, and most preferably 6-7 fins per centimeter. The evaporator device 10 can be made of stainless steel or food-grade composite plastic or alternately coated with a food-grade coating. The water flows from the evaporator device 10 to storage reservoir 20 via tube 21.

The storage reservoir 20 can be any container or storage mechanism known in the art. Preferably, as depicted in FIG. 1, a storage reservoir 20 is configured to hold condensed water. Storage reservoir 20 is made of any material which exhibits the necessary structural strength without contaminating the stored water, such as stainless steel or food-grade composite plastic. Reservoir 20 should have sufficient capacity to store the desired amount of condensed water, yet be small enough to fit within the space available in housing 2. The capacity of the storage means depends on the size of housing 2. Generally; the capacity can range from about 3.8 to about 38 liters. The storage reservoir 20 can be provided with any suitable sensor 16 and accompanying shut-off device as known in the art to control the level of the water in the storage means and prevent overflow. See, for example, U.S. Pat. No. 5,149,446 (column 4) and U.S. Pat. No. 5,301,516 (column 5), the disclosures of which are incorporated herein by reference. The storage reservoir 20 can also be provided with a secondary or back-up reservoir, (not shown) either internal or external to the housing 2 to collect water if no additional water is required.

The condensed water in the storage reservoir 20 is usually not suitable for drinking and other sanitary uses. Thus, the condensed water must be purified and/or cleaned prior to being dispensed. The purification process is achieved using at least one water purification unit. Purification processes, as known in the art, can be employed in the present invention to clean the water. For example, U.S. Pat. No. 4,204,956 (column 5), U.S. Pat. No. 5,227,053 (column 15), U.S. Pat. No. 5,669,221 (column 15), and U.S. Pat. No. 5,845,504 (column 25), U.S. Pat. No. 6,182,453 (column 46) & U.S. Pat. No. 7,272,947 are (column 35) hereby incorporated by reference disclose such elements.

In the preferred embodiment a two step purification process is employed. In the first step an ozonator 26 provides ozone to storage reservoir 20 via line 27. The ozone is delivered substantially near the top of the storage reservoir 20 to facilitate mixing. In the second stage, line 29 feeds the condensed water through a purification unit 28, the purification unit 28 can include a variety of methods to purify the water including: UV, ultrasound, ozone, and/or heat.

The water is manually dispensed on an on-demand basis when a control circuit is activated, the water is pumped, via pump 30 from storage reservoir 20 through the purification unit 28 at least once, and then out dispenser 40. The apparatus 1 unit can produce on average 7 gallons a day at the at 65% humidity at 75 degrees F. using approximately 0.019 KW/Gal.

In the alternative embodiment, a heating coil 41 can be positioned to heat the water for delivery. Alternatively, line 29 can be wrapped with a tube containing chilled water from suction line (not shown), high-pressure line (not shown) of the operating compressor 46 to cool the dispensed water or in the alternative a line (not shown) can be run close to the evaporating coil 10 to cool the water.

A plurality of outlet ports for air 50 are provided in one face of the housing 2. To reduce particulate in the interior of the housing 2, the outlet ports 50 in one face of the housing 2 can include shutters 52 that open to expel air, but close when air is not exiting the apparatus 1, to reduce the amount of particulate in the apparatus 1.

Figure 5:
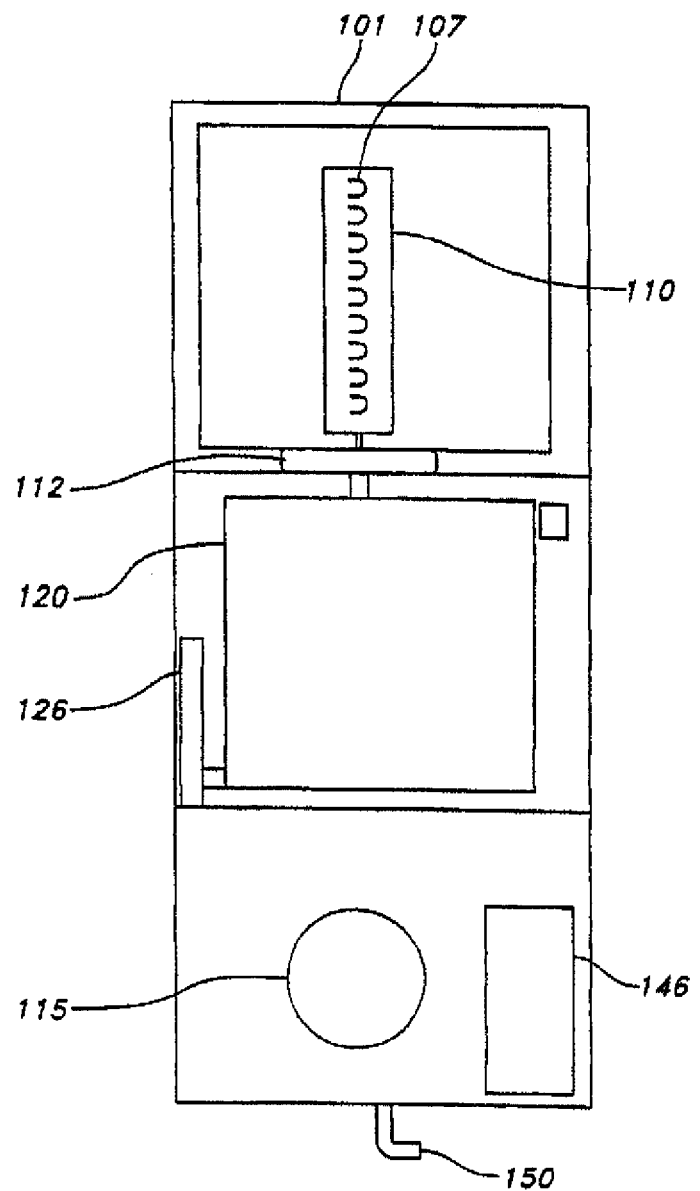
FIG. 5 shows a schematic view of one embodiment of an apparatus.
Figure 6:
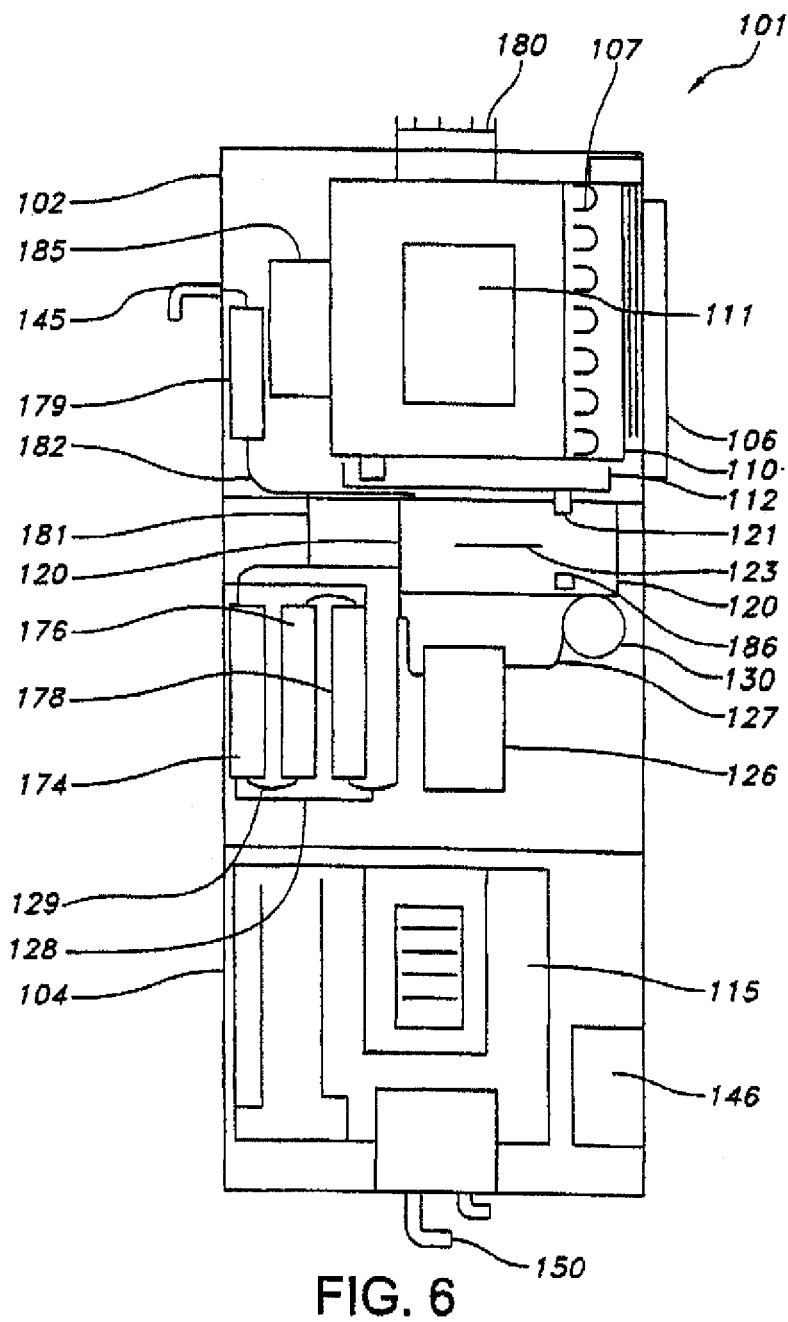
FIG. 6 shows a schematic a view of one embodiment of an apparatus.

Now referring to FIGS. 4-6, an apparatus 101 that can provide air-conditioning and purified water is shown. This apparatus 101 has a housing 102. In this embodiment, an air-conditioning coil 104, and air-conditioning fan 115 are shown in the apparatus 101. The hot air from the air-conditioning coil 104 is exhausted from port 150. Cool air exits the apparatus 101 via vent 180 when fan 185 is activated. A compressor 146 powers the movement of refrigerant thorough the coils, wherein an evaporator coil of the evaporator device 110 is in fluid communication with a condensing coil 104.

The housing 102 includes air inlets to intake ambient air 105, such as, a plurality of openings, such as, holes, louvers or perforations. The air inlets 105 allow ambient air to enter the apparatus 101. Inside the housing 102, moist ambient air is drawn over an evaporator device 110, such as evaporating surface with an evaporator fan 111. The ambient air contacts an air purification unit 106, such as an in-line high efficiency particulate air electrostatic filter that covers the plurality of openings 105. Filter 106 is attached to the housing using brackets (not shown) to provide a secure attachment and can be off-set from the housing 102 by a space. In the preferred embodiment, the space is about 2.5 cm. The brackets are configured to seal the space around filter 106 to prevent air from entering the apparatus 101 that has not passed through filter 106. In one embodiment, filter 106 is placed inside of the housing 102. The filter 106 is sized to remove airborne particulate. In the preferred embodiment, the evaporator device 110 is made of a series of tubes and substantially perpendicular fins 107. The fins 107 are selected to facilitate condensation of moisture from the air and in the preferred embodiment are corrugated and are configured as 5-8 fins per centimeter, and most preferably 6-7 fins per centimeter. The evaporator can be made of stainless steel or food-grade composite plastic or alternately coated with a food-grade coating.

A drain pan 112 is positioned to facilitate the removal of water. The drain pan 112 is preferably made of stainless steel or food-grade composite plastic. The water flows from the drain pan 112 to storage reservoir 120. In the preferred embodiment, tube 121 connects the drain pan 112 to storage reservoir 120. The water in the storage reservoir 120 is purified. The preferred embodiment uses a two step purification process. In the first step, an ozonator 126 provides ozone to storage reservoir 120 via line 127. The ozone is delivered ozone via a dispenser 186 substantially near a side of the storage reservoir 120 to facilitate mixing. In the preferred embodiment, a platform 123 is included in the storage reservoir 120 to facilitate mixing.

In the second stage, line 129 feeds the condensed water through a purification unit 128, the purification unit can include a variety of methods to purify the water including: UV, ultrasound, ozone, and/or heat. In this embodiment a purification unit 128 includes: re-mineralizing filter 174 carbon black filter 176 and optionally second carbon block filter 178. Additionally, the purification unit can include a UV element 179. The purification unit 128 can include an active carbon filter to remove organic chemicals, and alternatively a dust filter.

The purified water can be re-circulated to reservoir 120 or in an alternative embodiment fed directly to in-line UV unit 179 via line 181. Line 182 provides water from reservoir 120 to UV element 179. The water is manually dispensed on an on-demand basis when a control circuit is activated. The water is pumped, via pump 130, through storage reservoir 120 through the purification unit 128 at least once, and then out dispenser 145. The apparatus 101 can produce at least 26.5 liters of water in 20 hours of operation at 65% humidity at 75 degrees F.

Figure 7:
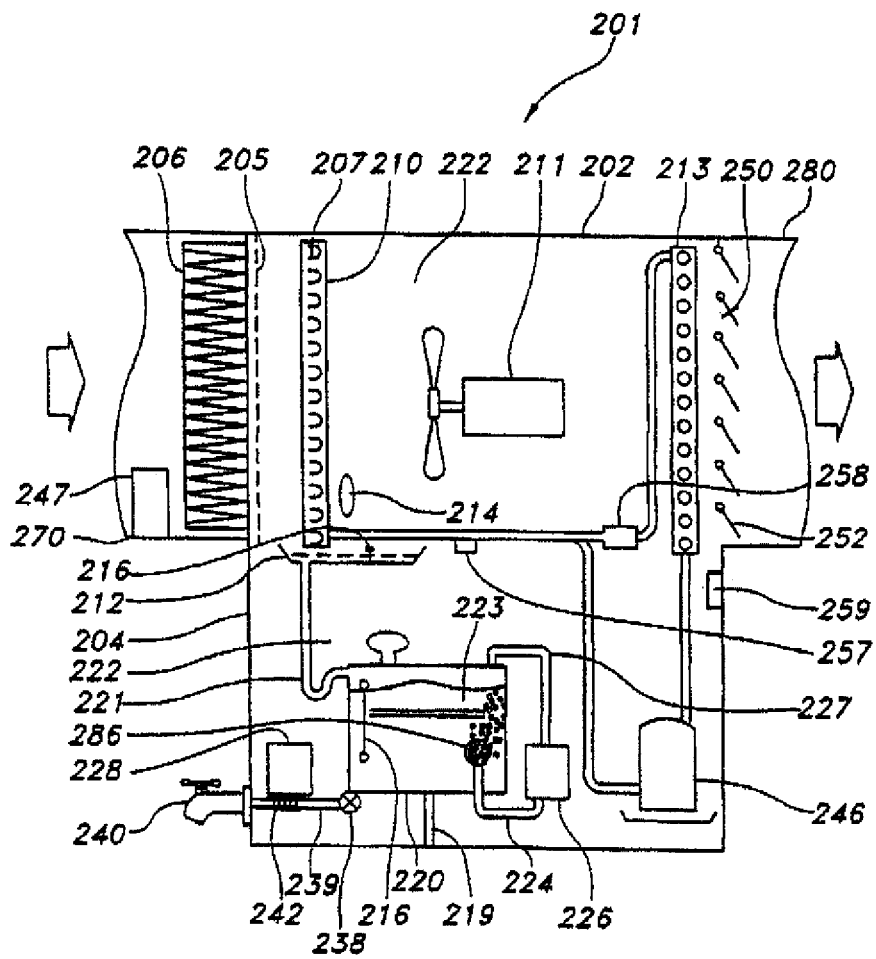
FIG. 7 shows a schematic view of the fixed embodiment of an apparatus.
Figure 8:
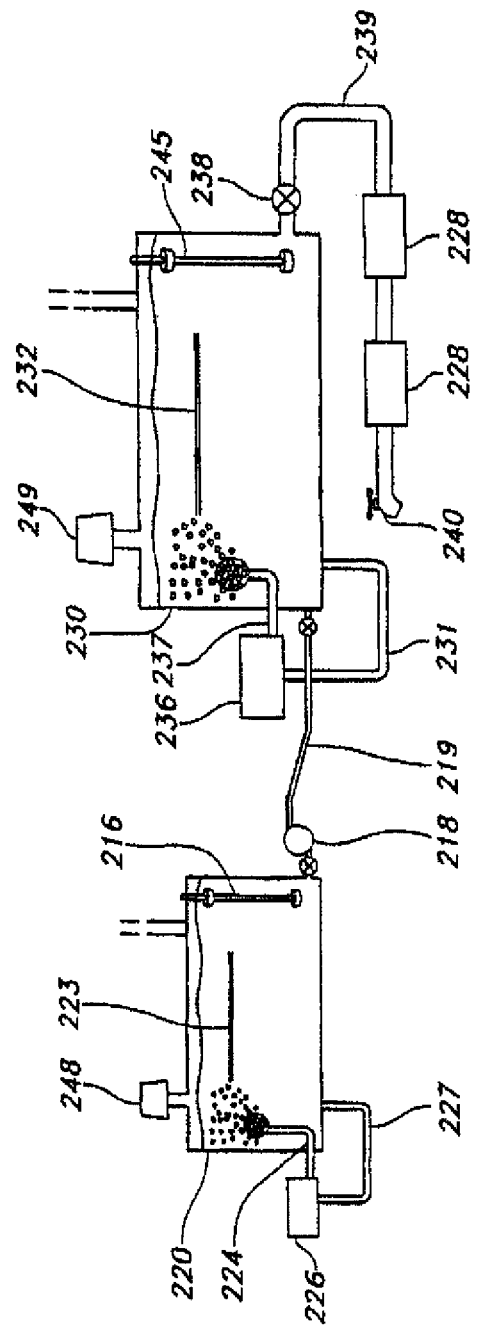
FIG. 8 shows a schematic view of a portion of the fixed embodiment of the apparatus.

Now referring to FIGS. 7-8, an apparatus 201 to produce drinking water and provide air conditioning is shown. Apparatus 201 is made of a housing 202. The housing 202 has at least one face 204 including an inlet to intake ambient air 205, such as, a plurality of openings, such as, holes, louvers or perforations. The air inlet 205 allows ambient air to enter the apparatus 201. The ambient air contacts an air purification unit 206, such as an in-line high efficiency particulate air electrostatic filter that covers the plurality of openings 205. Filter 206 is attached to the housing using brackets (not shown) to provide a secure attachment and can be off-set from the housing 202 by a space. In the preferred embodiment, the space is about 2.5 cm. The brackets are configured to seal the space around filter 206 to prevent air from entering the apparatus 201 that has not passed through filter 206. In one embodiment, filter 206 is placed inside of the housing 202. The filter 206 is sized to remove airborne particulate. In an alternative embodiment the air purification unit 206 can include an in-line air purifying device 247. In an alternative embodiment the filter is electrostatic.

Inside the housing 202, moist ambient air is drawn over an evaporator device 210, with an evaporating surface, with a fan 211, positioned to facilitate movement of air across the evaporating surface. Fan 211 can operate at low, medium and high speeds. High speed is used in the air-conditioning mode. Since the saturation vapor pressure of water decreases with decreasing temperature, the water in the air condenses, and drips into a drain pan 212. The cool air can be used to cool down the warm refrigeration coil 213. Solenoid 257 allows refrigerant flow to evaporator 210 and solenoid 258 allows flow to the condenser 213. When the apparatus 201 is in the "on-mode" and a sensor such as a thermostat 259 reaches a high set point solenoid 257 closes and solenoid 258 opens and allows refrigerant to flow to the condenser 213. When thermostat 259 reaches a low set point, solenoid 257 opens and solenoid 258 closes so that refrigerant flows to the evaporator 210. When the machine is in the "off mode," if the thermostat 259 reaches the high set point, solenoid 257 closes and solenoid 258 opens to allow refrigerant to the condenser 213. If the compressor 246 is on and the fan 211 is on and the thermostat 259 reaches a low set point, then solenoid 257 closes and solenoid 258 closes to turn the compressor 246 off and the fan 211 off.

In one embodiment, a plurality of outlet ports for air 250 is provided in one face of the housing 202. To reduce particulate in the interior of the housing 202, the outlet ports 250 in one face of the housing 202 shutters 252 substantially cover the outlet ports that open to expel air, but close when air is not exiting the apparatus 201. Additionally, a fan 211 is positioned to expel cold air from the plurality of outlet ports 250.

In this embodiment the condenser coils of the condenser 213 range from 1.48 to 7.59 face area in sq. m, depending on the size of the apparatus 201. The fins per centimeter range from 1 to 6. In the preferred embodiment, the condenser coil 213 is made of aluminum fins and copper tubing. A compressor 246 powers the movement of refrigerant through the coils. Various types of compressors can be used including reciprocating hermetic and scroll.

In the preferred embodiment, the evaporator device 210 is made of a series of tubes and substantially perpendicular fins 207. The fins 207 are selected to facilitate condensation of moisture from the air and in the preferred embodiment are corrugated and are configured as 5-8 fins per cm, and most preferably 6-7 fins per centimeter. The face area of the evaporator device 210 includes coil ranging from 7 to 35.6 sq. ft. The evaporator device 210 can be made of stainless steel or food-grade composite plastic or alternately coated with a food-grade coating.

In an alternative embodiment, the fins 207 are periodically agitated by an agitation device 214 to facilitate the removal of water. This can be accomplished by a mechanical device, such as a plunger or a shaker or by an acoustic vibration. The frequency of the vibration is related to the amount of water required. The agitation device 214 can be triggered by a relative humidity sensor, a temperature sensor 259 or timed to occur at fixed intervals.

The water flows from the drain pan 212 to storage reservoir 220. In one embodiment, the drain pan is positioned in at least a 5 degree angle from the evaporator device to facilitate the removal of moisture. In the preferred embodiment, tube 221 connects the drain pan 212 to storage reservoir 220. The tube 221 can have a "U" shape to form a water seal to prevent ingress of tramp air into reservoir 220. In an alternative embodiment, a pre-filter 222 is in fluid communication with the drain pan 212. The pre-filter 222 can include a particulate screen for removing particles larger than a predetermined size from water passing through the pre-filter 222.

The storage reservoir 220 can be provided with any suitable sensor 216 and accompanying shut-off device as known in the art to control the level of the water in the storage means and prevent overflow. See, for example, U.S. Pat. No. 5,149,446 (column 4) and U.S. Pat. No. 5,301,516 (column 5), the disclosures of which are incorporated herein by reference. The storage reservoir 220 can also be provided with a secondary or back-up reservoir, (not shown) either internal or external to the housing 202 to collect water if no additional water is required. The apparatus 201 can produce about 26.5 liters of water in 18 hours of operation.

The condensed water in the storage reservoir 220 is usually not suitable for drinking and other sanitary uses. Thus, the condensed water must be purified and/or cleaned prior to being dispensed as previously described. In the preferred embodiment a two step purification process is employed. In the first step an ozonator 226 provides ozone to storage reservoir 220 via line 224. The ozone is delivered via a nozzle 286 substantially near the side of the storage reservoir 220 to facilitate mixing. In the preferred embodiment, a platform 223 is included in the storage reservoir 220 to facilitate mixing. An artificial one way air valve 248 allows outside air to enter the storage reservoir 220. Water can be recycled thorough reservoir 220 via line 227 via pump (not shown). A level sensor 216 is reservoir 220 shows the level of water. When water reaches this level, water is removed from the reservoir 220 through conduit 239 through at least one water purification element 228.

Now referring to FIG. 8, a second larger reservoir 230 is provided that can be fluidly connected to the storage reservoir 220. A pump 218 can be used to pump water via line 219 to a second reservoir 230 from the first reservoir 220. The ozone generator 236 delivers ozone via line 237 to the second reservoir 230. The ozone injector can provide ozone on a timed basis from between 5 to 15 minutes. The ozone bubbles facilitate mixing in second reservoir 230 as they circulate around platform 232. A platform 232 is provided to facilitate circulation in the second reservoir 230. A sensor 245 detects the water level in the second reservoir 230.

In one embodiment, sensor 245 is a top reservoir float that turns the apparatus on in the water production mode when the tank is full. The sensor 245 can also be a bottom tank float that controls power to the thermostat 259 so that the thermostat 259 can call for chilling to chill coil unless the coil is covered with water. Line 239 drains water from reservoir 230 using pump 238. The water in the reservoir 230 can be further sanitized by a variety of methods including UV, ultrasound, and ozone.

The water is manually dispensed on an on-demand basis when a control circuit is activated, the water is pumped from storage reservoir 220 through the purification unit 228 at least once, and then out dispenser 240.

In the alternative embodiment, a heating coil 241 can be used to heat the water for delivery. Alternatively, line 229 can be wrapped with a tube containing chilled water from suction line (not shown), high-pressure line (not shown) of the operating compressor 246 to cool the dispensed water or in the alternatively a line can be run close to the evaporating coil 210 to cool the water.

Figure 9:
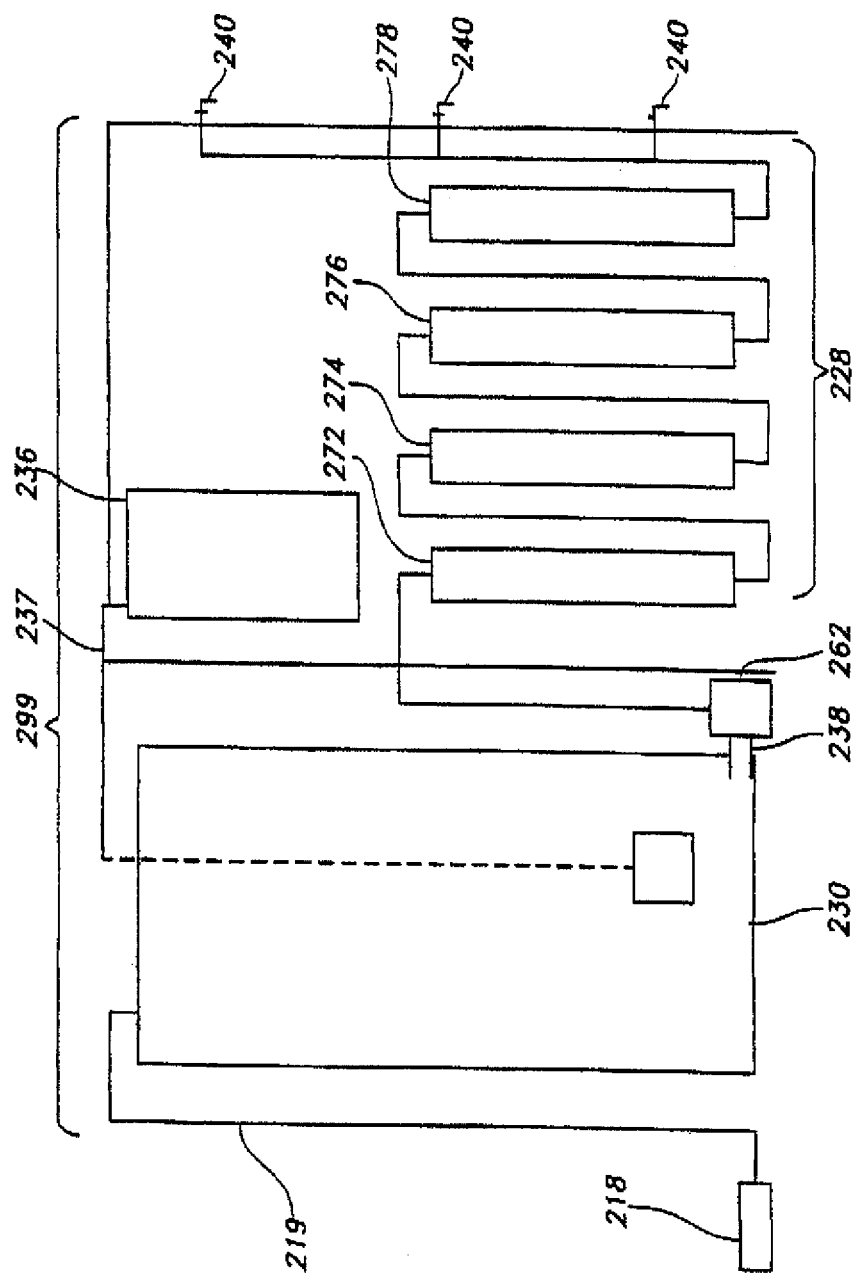
FIG. 9 shows a schematic view of a portion of the fixed embodiment of the apparatus.

Now referring to FIG. 9, a purification module 299 is shown. The purification module 299 includes the storage reservoir 230, pump device 238, ozonator 236, water purification unit 228 and fluid lines as shown in FIG. 9. Purification module 299 also includes: a pump 238 to move water through a purification unit 228. The water purification unit 228 can include an in-line UV element 272, re-mineralizing 274, carbon block 276 and an optional second carbon block filter 278. The purification unit 228 can include an active carbon filter to remove organic chemicals, and alternatively a dust filter. More than one purification module 299 can be fluidly linked in series.

The apparatus 201 is controlled by a computer controller based on sensor readings of temperature or relative humidity settings. Alternatively, the apparatus 201 can be controlled by water level in reservoir 220 or reservoir 230. When the water level sensor 216 or 245 detects the water level, the apparatus 201 stops producing water.

A large commercial unit can produce 100-3200 gallons of potable water. The potable water produced according with apparatus 201 can be used to fill water bottles. In one embodiment, the water bottles are made of a biodegradable material, such as Oxo Biodegradable (OBD) plastic. OBD is polyolefin plastic to which has been added very small (catalytic) amounts of metal salts. The water bottles can also be recyclable, such as bottles, made with PET.

Figure 10:
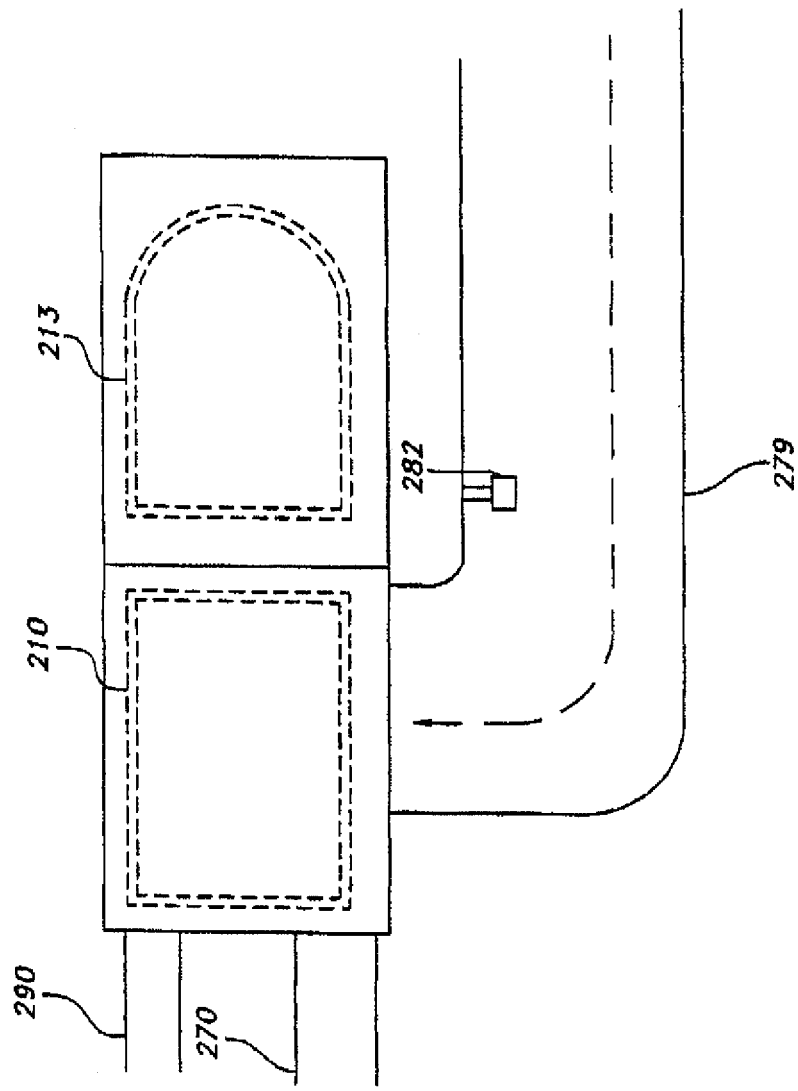
FIG. 10 shows a schematic view of a portion of the fixed embodiment of the apparatus.

Now referring to FIGS. 10 and 11, a system is shown wherein the apparatus 201 can be connected in-part to a structure's forced-air distribution system. Thus, the same motor, blower, and ductwork used for heating are used to distribute cool air from the air conditioning system. When a central air conditioner is operating, hot air inside the structure flows to the furnace through the return-air duct 270. The hot air is moved by the blower across the cooled evaporator coil 210 in the plenum and is then delivered through ducts to cool the structure. The evaporator coil 210 used in air-conditioning apparatus, such as a furnace, air handling units, heat pumps and package air conditioners, extracts moisture from the air which flows across the evaporator coil of the evaporator device 210. The moisture extracted creates a condensate on the exterior of the coil 210 which drips into a drain pan 212. If the thermostat 253 shows the desired temperature is reached, the housing 202 includes shutter 275 which can direct cooled air to conduit back to the condensing coil 213.

For example, a conduit system 280 provides conditioned air to the structure 290 wherein the conduit 280 includes a shutter 275 configured to actuate in the closed position, if the temperature of the structure has not achieved a set temperature and configured to actuate in the open position (i.e. pivots 90 degrees to block the conduit) if the temperature has achieved a set temperature.

Similarly, if the relative humidity sensor 282 shows that the relative humidity has dropped below a predetermined point, shutter 288 opens (pivots 45 degrees) to allow entry of moisture rich ambient air. A conduit 270 includes a shutter 288 configured to actuate in the closed position, if the relative humidity sensor 282 in the structure 290 such as a dwelling is above a set number and configured to actuate in the open position if the relative humidity is below a set number. In this embodiment, the air purification means can be an electrostatic filter 206 fixed in the duct 270 or attached to housing 202. In an alternate embodiment, an indoor air purifier 247) is attached to the centralized HVAC system to reduce bacteria and improve air quality. In an alternative embodiment the filter is electrostatic.

Now referring to FIGS. 12 A, B and C an apparatus 301 includes a condensing coil (hot-coil) 313 and evaporating coil (cool-coil) 310 and storage tank 320. The condensing coil 313 is located outside of the structure and is connected to the at least one housing 302 via a flexible refrigerant hose 315. Housing 302, including the evaporating coil 310, is fixedly mounted to either a wall 325 or window 336. This unit is the evaporating unit 311. This housing 302 includes air intake inlet to intake ambient air 335. This opening 335 is a plurality of openings, such as holes, louvers or perforations. The opening 335 allows ambient air to enter the apparatus 301. An electrostatic filter 306 is attached to evaporating unit 311. Filter 306 allows the ambient air to flow through to the apparatus 301. The air outlet opening 307 is on the bottom of the housing 302. The storage tank 320 is attached to a purification unit 327 that can include a pump 321, an in-line ozone element, re-mineralizing filter, carbon black, a second carbon black, and a UV element. The purification unit 327 can include an active carbon filter to remove organic chemicals, and alternatively a dust filter. Cool air exits the apparatus 302 via vent 331 when fan 308 is activated.

The condensing coil 313 is included in a housing 309 and is fixedly located outside of structure 312. This is the condenser unit 314. Flexible refrigerant hoses 315 and releasable couplings 317 are provided for connecting the evaporator unit 311 with the condenser unit 314. Now referring to FIG. 12C evaporating units 311 are positioned in at least at one room of the structure and are connected via flexible refrigerant hoses 315 and releasable couplings 317 to the condenser unit 314.

Now referring to FIG. 13, a large apparatus of 2 or more tons is shown. A 20 ton unit, for example, will produce approximately 350 Gallons at 1.39 KWH/Gal. at 65% humidity at 75 degrees F. The unit included air filter 206 that substantially covers an air inlet 205. A first evaporating coil (cool-coil) 210, and a plurality of compressors 246 and a second evaporating coil (cool-coil) 287 is positioned to condense water into a reservoir 220. The water is filtered though water purification unit 228 and then dispensed.

Figure 14:
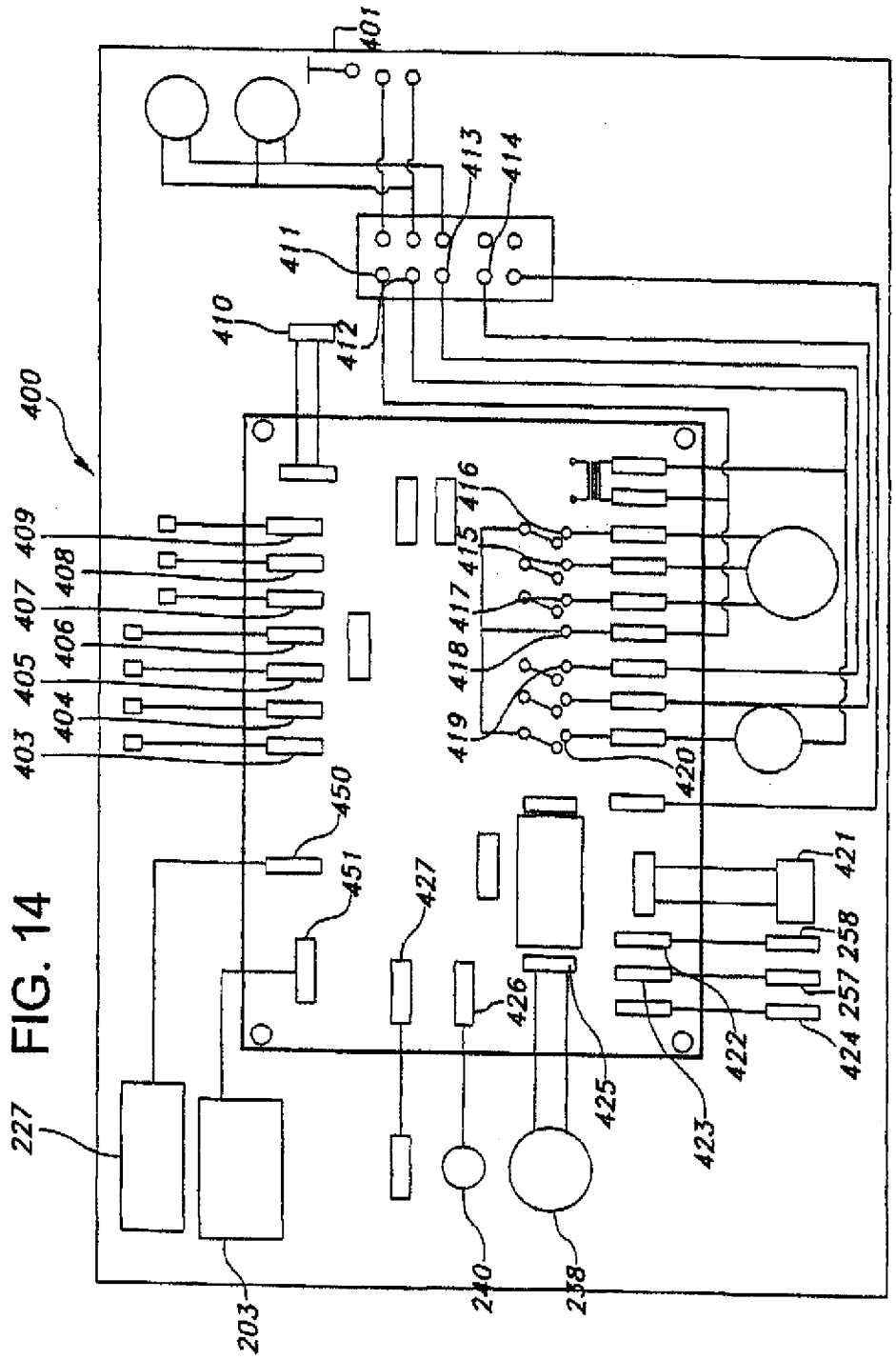
FIG. 14 shows a schematic of the electrical configuration of the apparatus.

Now referring to FIG. 14, a schematic of the control system 400 for apparatus to produce potable water is shown. The printed circuit board 401 (PCB) contains the electronics that power, monitor and control the system. Connections to the PCB 401 are required to interface it to the elements of the equipment and to the outside environment, including electrical power sources (not shown). The connections are made by means of different types of connectors that allow wires to be attached and/or detached to/from the PCB 401 to various elements of the apparatus 201. These elements that are controlled by the PCB 401 will be discussed. The PCB 401 includes a display circuit 451 which has a digital, alphanumeric readout in housing 202 on the front panel of the apparatus 201. The PCB 401 includes an ozone gas generator control 450 in ozonator 226. The PCB 401 also includes control circuit 450 for ozone line 227.

PCB 401 is connected to the relative humidity sensor 403, ambient temperature sensor 404 evaporator temperature sensor 405 cold water thermostat sensor 406, level sensor for float no. 3 407, level sensor for float no. 2 408, level sensor for float no. 1, 409, emergency cut-off switch 410, line neutral 411, line lead 412 hot lead 413, spare 414, low evaporator fan speed 415, medium evaporator fan speed 416, high evaporator fan speed 417, line hot lead 418, refrigeration compressor 419, sleep control 420, 24 VAC transformer 421, two way solenoid valve 258 and control circuit 422, two way solenoid valve 257 and control circuit 423, hot gas bypass valve control 424, water pump 238 and control circuit 425, dispenser 240 and dispensing valve control 426, 24 VAC 3-way water solenoid valve (not shown) and control circuit 427 and a plurality of GF1 plugs (not shown).

Figure 15:
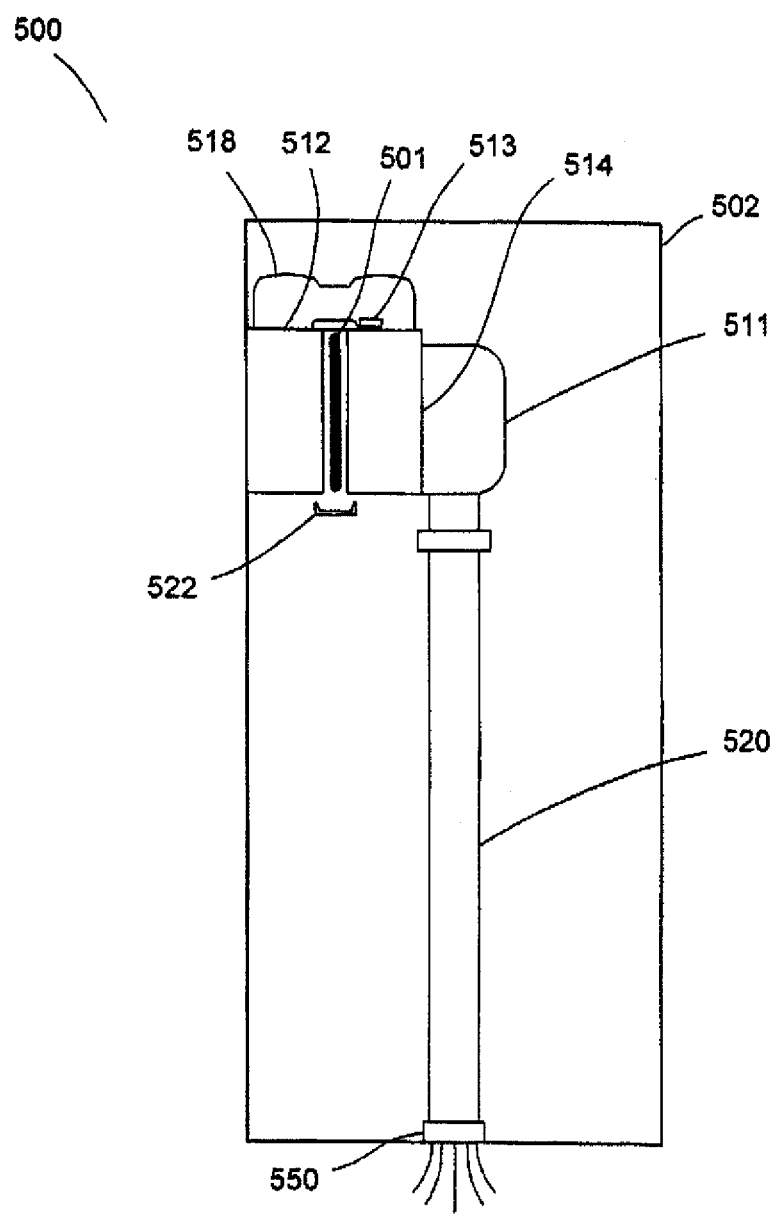
FIG. 15 shows a view of one embodiment of the invention.

Now referring to FIG. 15, the apparatus 500 includes a combination coil 518 that is painted with an FDA approved coating. This combination coil 518 is made of at least one evaporator coil 512 and at least one condensing coil 513 enclosed in a metal casing 514. The apparatus 500 has at least one source of germicidal activity such as a germicidal bulb 501 (UV and Ozone) placed in between the coils 512 and 513 to clean the air that passes through. The germicidal bulb 501 can be positioned to reduce germs, viruses or bacteria on the coil fins of 512 and 513 and the drip pan 522. These germicidal bulbs, in the preferred embodiment, emit 253.7 nm light with an intensity (at 1 meter) of 57 microwatts per cm squared.

A fan 511 is positioned to blow air on the condensing coil 513. A portion of the air is transmitted along tube exhaust conduit 520 and is exited out an aperture 550 in the bottom of the housing 502. The combination coils unit 518 located on the side of the apparatus 500 pull the outside air through both combination coils 512 and 513. A blower fan 511 and housing 502 that pulls the air through the coils 512 and 513 and passes the air through a fireproof conduit 520 that exists through the bottom of the apparatus 550. The air that is exhausted into the room has been purified by this germicidal bulb 501. This also produces a much quieter and more efficient apparatus 500. The combination coil 518 unit produces water faster at 65% humidity and 72 degree temperature, and will produce 7 gallons of water in 24 hours allowing for less energy consumption.

Figure 16:
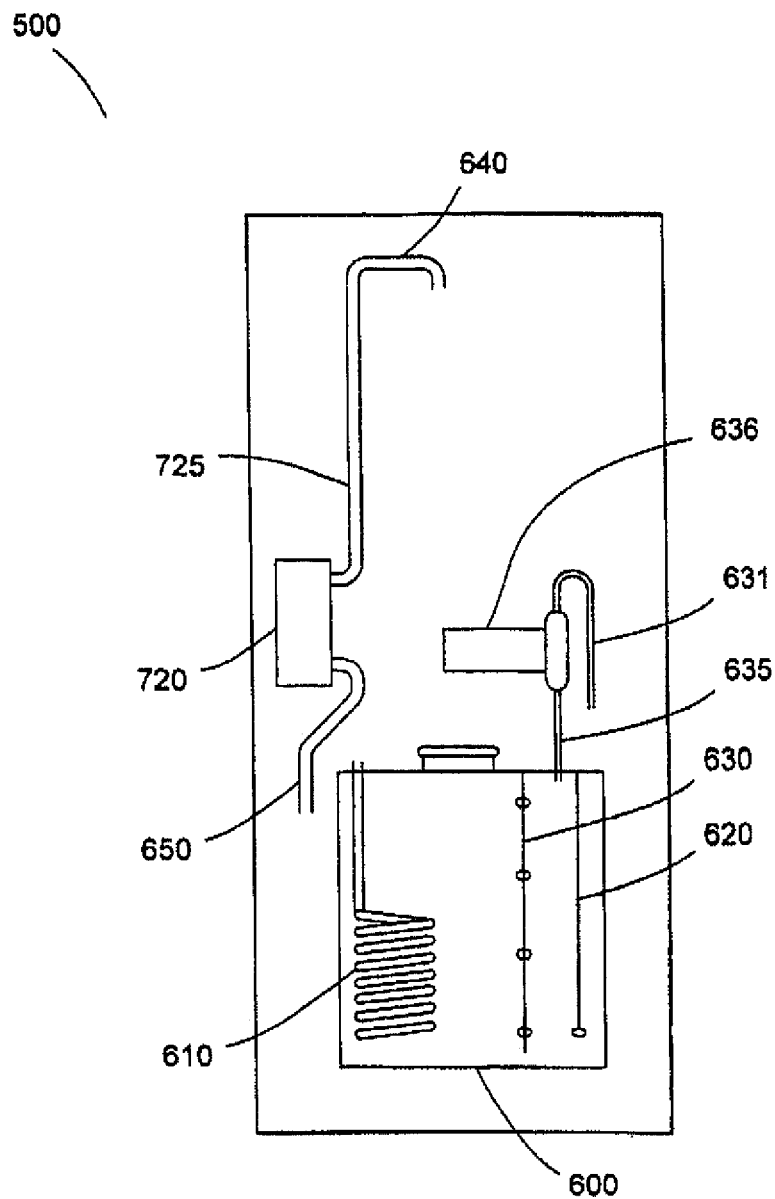
FIG. 16 shows a view of one embodiment of the invention.
Figure 17:
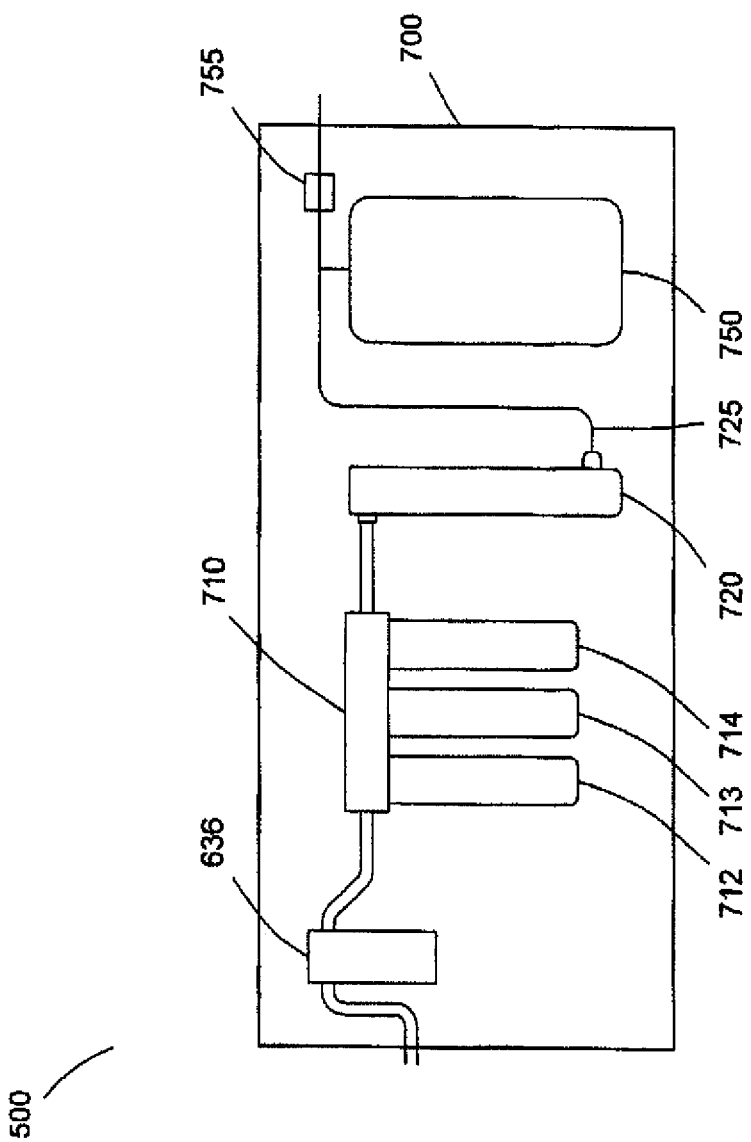
FIG. 17 shows a view of one embodiment of the invention.
Figure 18:
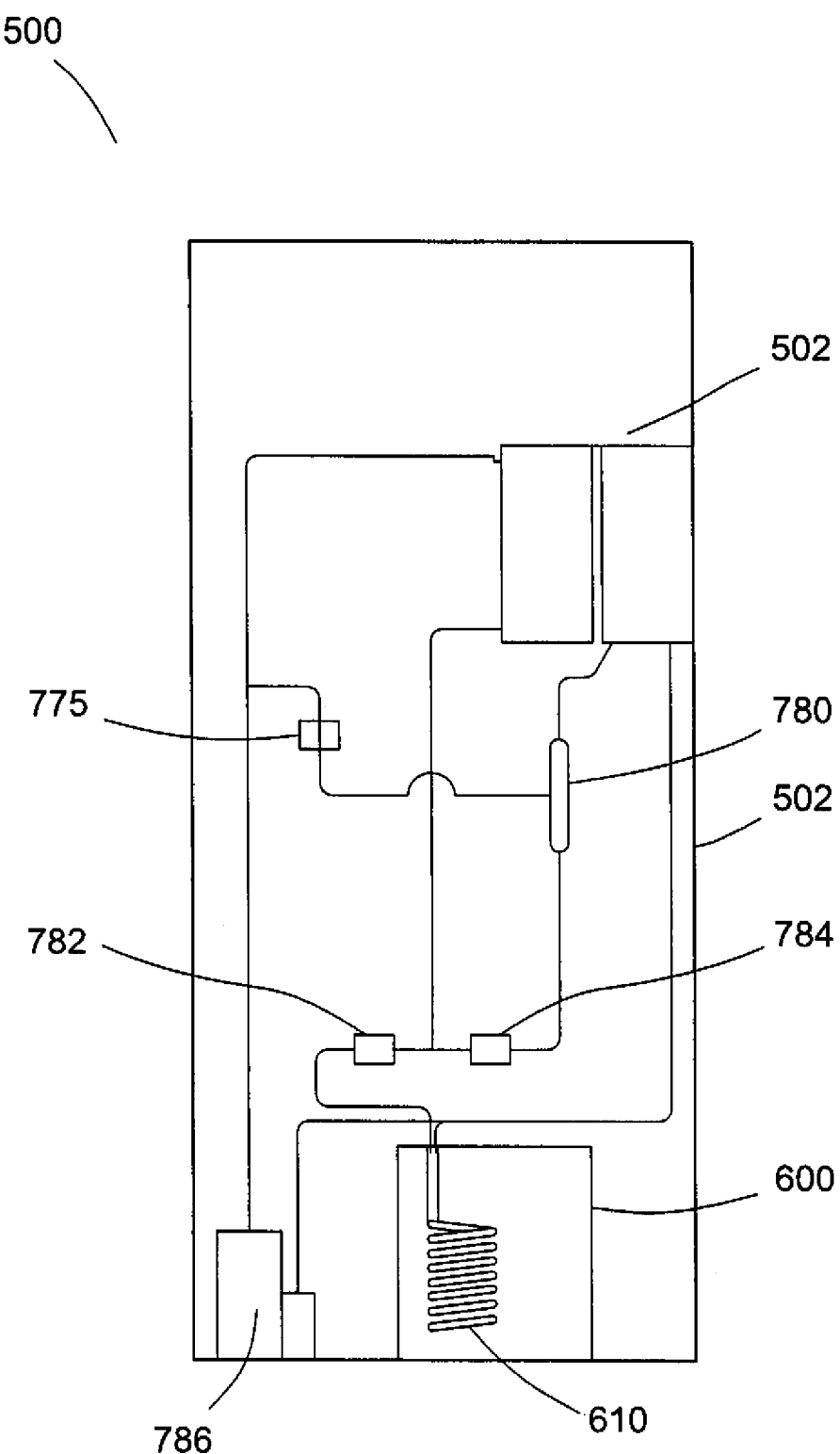
FIG. 18 shows a view of one embodiment of the invention.

Now referring to FIGS. 16-18, a tank 600 includes a cooling coil 610 and an ozone source 620. The tank 600 is connected via a conduit 631 and pump 636 to a series of filters 631. A conduit 635 leads to pump 636 and conduit 637 to filters 631. When the reservoir tank 600 is full, the apparatus 500 shuts down, only to be turned on periodically by the computer-timed ozone, recirculation and cooling devices 610. This allows for less energy consumption since the apparatus 500 is not constantly running. When the demand for water is needed, the water is pumped out of the reservoir tank 600 through filtration skid 700. The water is then passed through a UV tube 720 and out of the dispensing device 803.

The apparatus 500 uses an environmentally friendly refrigerant called 410A. When the apparatus' tank 600 is full, it shuts off until the water level drops below the three quarter level. At that point, the apparatus 500 will begin producing water. The water is cooled by a stainless steel coil 610 inside the reservoir tank 600, keeping the water temperature between 40 and 45 degrees.

The apparatus 500 is equipped with a hot gas bypass valve 775. The hot gas bypass valve 775 will open if the evaporator coil 512 starts to freeze and defrost the coil 512, producing waster from the frost and preventing freezing of the coils. The hot gas bypass valve 775 is computer controlled and temperature sensitive. The temperature of the coil 775 is sensed by a temperature probe 776 letting the printed circuit board 401 know when the coils 512 begin to freeze and turning on the hot gas bypass valve 775.

Now referring to FIG. 18, the apparatus 500 includes a dual evaporation and condensing coil comprising combination coil 518 and compressor 786. The apparatus 500 also includes water making solenoid valve 784 and water cooling solenoid valve 782. Water tank 600 contains cooling coil 610. Hot gas bypass valve 775 and drier 780 are also in the apparatus 500.

Now referring to FIG. 17, the filtration skid 700 includes a filtration unit 710. The filtration unit 710 includes a sediment filter 712, carbon black 713 and re-mineralizing filter 714. This filtration unit 710 is in-line with a source of UV radiation 720. The UV radiation unit 720 can be connected to a secondary tank 750. A conduit 640 allows the potable water to flow to a dispensing unit (not shown). The apparatus 500 is equipped with a stainless steel reservoir tank 600 and is continuously ozonated. The tank 600 is equipped with a series of float valves 630. When the tank 600 is full the top float valve 630 will activate and shut the apparatus 500 down. When the water level reaches ½, the second float valve 636 will turn on the apparatus 500 and begin producing water. There is an on-demand water pump that senses demand and will pump the water into an external tank 750 and/or the filtration unit 710. The filtration unit 710 consists of an on-demand pump and a series of filters, the first a re-mineralizing 712, second a carbon block filter 713 and an optional second carbon block filter 714. The water is passed through a UV tube 720 into a pressurized reserve tank 750 for further purification and then goes to the dispensing unit. There are a series of magnets 755 with a sediment filter wrapped on the last length of conduit upstream of the dispensing device 803.

In one embodiment, magnetic devices 755 are used to improve the quality of the water. Magnetic devices consist of one or more permanent magnets affixed to the exterior surface of the water pipe. The water is exposed to the magnetic field as it flows through the pipe between the magnets. The water and water solutions passed through these magnetic fields acquire finer and more homogeneous structures. Magnets affect the bonding angle between the hydrogen and the oxygen atom in the water molecule. The smaller cluster leads to better absorption of water across cell walls. Magnetizing the drinking water breaks its surface tension, making it wetter and more useable by every cell in your body. Additionally, by applying a magnetic field to water can not only make it wetter, but it can also raise its pH.

Figure 19:
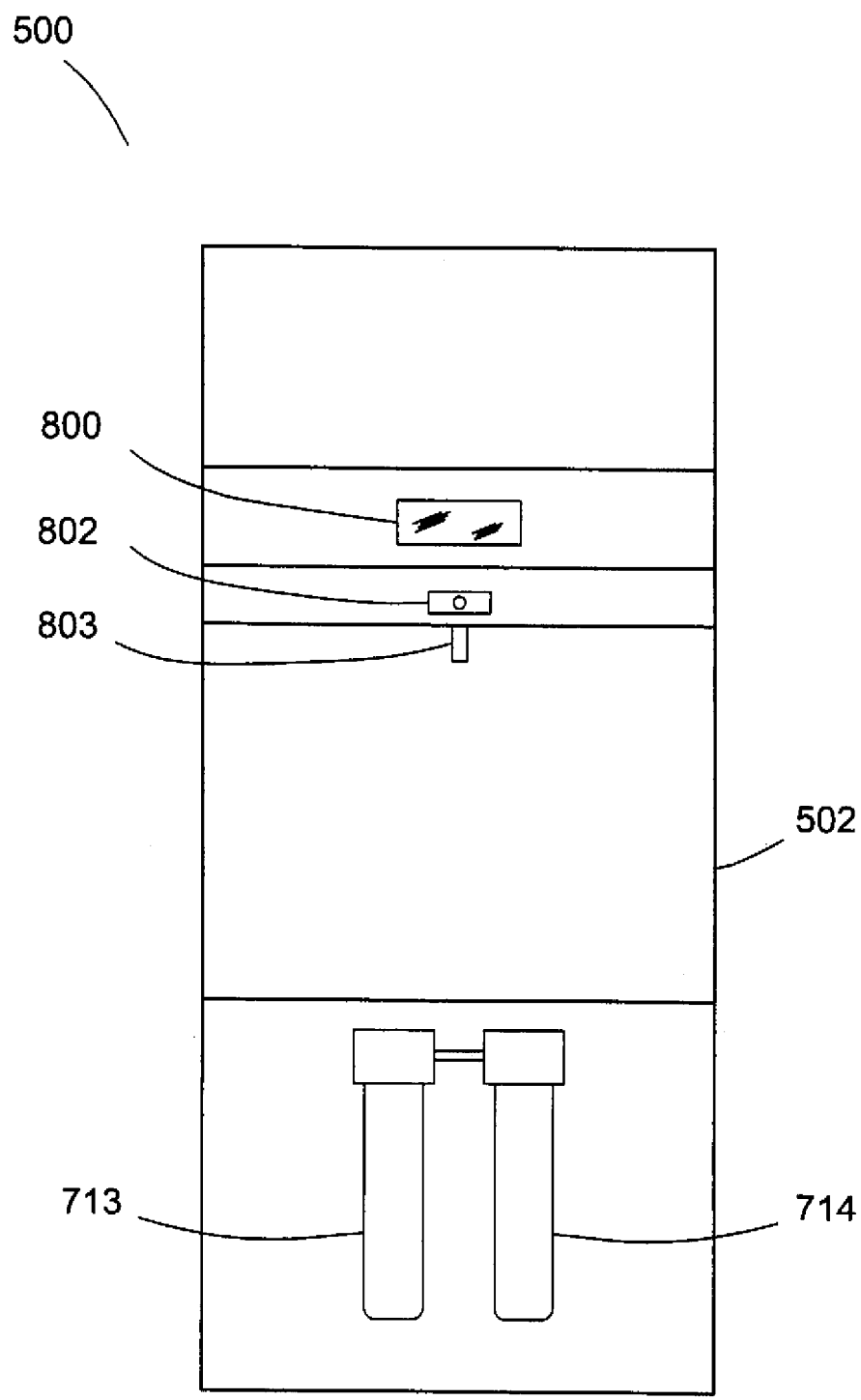
FIG. 19 shows a view of one embodiment of the invention.

Now referring to FIG. 19, the housing 502 has a display 800, a display bath 802, and dispensing device 803, for providing chilled potable water on demand. The dispensing device 803 is a tube or conduit to dispense water to a container.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicant's general concept.

The invention claimed is:

1. An apparatus to purify water comprising: a pump to move water through said apparatus, a water reservoir positioned to receive unpurified water, an ozonator connected to said reservoir to provide ozone via a dispenser to said reservoir; and at least one water purification unit positioned downstream from said water reservoir, including an in-line UV element, sedimentation filter, and carbon block filter, further comprising a platform positioned in said reservoir to facilitate mixing.

2. The apparatus of claim 1 wherein said ozone dispenser is substantially near the top of the storage reservoir to facilitate mixing.

3. The apparatus of claim 1 further comprising an dust filter positioned on the exterior of said unit to remove dust.

4. The apparatus of claim 1 further comprising an electrostatic filter positioned on the exterior of said unit to remove dust.

* * * * *